United States Patent [19]

Shimooka et al.

[11] 4,178,615
[45] Dec. 11, 1979

[54] APERTURE PLATE FOR AN EXPOSURE HEAD FOR USE IN A PICTURE SCANNING REPRODUCER

[75] Inventors: Riyo Shimooka, Kyoto; Masuo Kunisawa, Uji; Seiji Okazaki, Kyoto, all of Japan

[73] Assignee: Dainippon Screen Seizo Kabushiki Kaisha, Kyoto, Japan

[21] Appl. No.: 855,472

[22] Filed: Nov. 28, 1977

[30] Foreign Application Priority Data

Nov. 30, 1976 [JP] Japan .................................. 51-160331

[51] Int. Cl.² .......................... H04N 1/22; G11B 7/18; G03B 27/50; G03B 27/68
[52] U.S. Cl. .............................. 358/302; 179/100.31; 355/52; 358/202
[58] Field of Search ............... 358/302, 202, 203, 204; 179/100.31; 354/8; 355/52

[56] References Cited

U.S. PATENT DOCUMENTS 1,717,781  6/1929  Ives ....................................... 358/302
3,541,253  11/1970  Shonnard ............................. 358/302

FOREIGN PATENT DOCUMENTS 331765  7/1930  United Kingdom ..................... 358/204

Primary Examiner—Bernard Konick
Assistant Examiner—Donald McElheny, Jr.
Attorney, Agent, or Firm—Zarley, McKee, Thomte, Voorhees & Sease

[57] ABSTRACT

An aperture plate for use in the exposure head of a picture scanning reproducer which constructs an image by exposure of a film attached to a rotating drum in scanning mode, the aperture of which plate has a shape incorporating parallel lines and end portions consisting of twin lines opening up away from a cusp, which in some embodiments may be exponential curves, whereby overlap effects in the constructed image are substantially eliminated.

3 Claims, 9 Drawing Figures

FEED DIRECTION

PRIOR ART FIG. 1
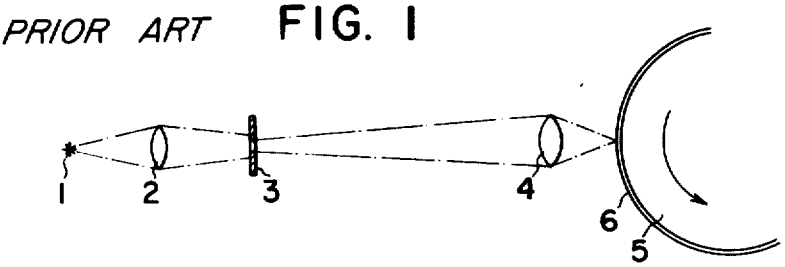
PRIOR ART FIG. 2
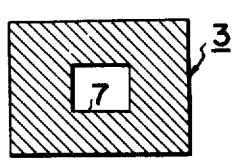
FIG. 3 PRIOR ART
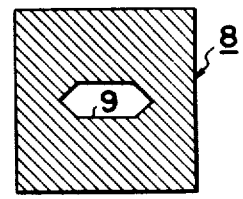
PRIOR ART FIG. 4
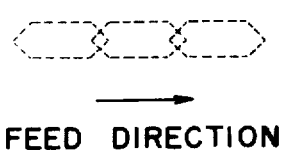
PRIOR ART FIG. 6
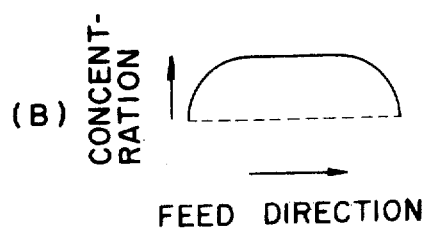
PRIOR ART FIG. 5
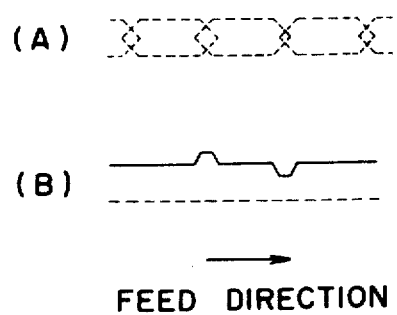

FEED DIRECTION

APERTURE PLATE FOR AN EXPOSURE HEAD FOR USE IN A PICTURE SCANNING REPRODUCER

This invention relates to an aperture plate for an exposure head of a picture scanning reproducer by which a reproduction picture is obtained by exposing in scanning mode a film attached to a rotating recording cylinder by means of a light beam modulated by an image signal, the light beam being generated by the exposure head of a scanner for plate making, facsimile or the like. The scanning is effected by feeding the exposure head along the axis of rotation of the recording cylinder, the feed direction thus being at right angles to the direction of the scanning lines effected by the rotation of the drum.

Heretofore, many aperture plates have been known. A conventional aperture plate having a rectangular aperture has a disadvantage, viz. when a picture image is exposed in scanning mode by using an aperture plate of this kind, and the scan line is perturbed in the feed direction by vibration of the exposure head caused by the rotation of part of the machine, or a shock from outside, the overlap of the scan lines doubles the amount of the exposure, resulting in a line of contrasting thick tone.

In order to remove this disadvantage, there has been reported another conventional aperture plate having a hexagonal aperture, i.e. both ends of the aperture in the feed direction are cut off in a triangle. However, this kind of aperture plate has another disadvantage.

That is, obviously the scan lines produced by such a plate must be arranged to overlap one another slightly, in order that the less-exposed portions produced by the tapered ends of the hexagonal aperture may coincide and hence result in a portion exposed to the same degree as the central portions of the lines. However, due to the fact that the response of photographic film to light is generally logarithmic, and not additive, the linear shape of the ends of the hexagons results in over-exposure of the doubly exposed portions, which results in a slight stripe in the finished picture.

Therefore it is an object of the present invention to provide an aperture plate free from the above described disadvantage, with which a reproduction image having a less pronounced line of contrasting tone is obtained.

This object is accomplished by using an aperture plate having an aperture consisting of a pair of parallel sides and with ends in the feed direction consisting of two lines which start from a mutually defined cusp and open up away from one another in the direction away from the cusp. The ideal rate of divergence of these curves is exponential, to counteract the logarithmic nature of the response of the film, but any curves which open up away from the cusp will provide a very satisfactory improvement in performance over the prior art hexagon shape, according to the present invention.

Other objects, features, and advantages of the present invention will be apparent from the following description of the prior art and the present invention when taken in connection with the accompanying drawings, in which:

FIG. 1 is a schematic view of the optical system of an exposure head of a picture scanning reproducer;

FIGS. 2 and 3 are outlines of conventional aperture plates for exposure;

FIG. 4 is a schematic view of the pattern of light intensity obtained by using the aperture plate shown in FIG. 3 at a regular scan line pitch in the feed direction;

FIG. 5 is a schematic view of (A) the pattern of light intensity obtained at an irregular scan line pitch, and (B) the corresponding exposure pattern;

FIG. 6 is a schematic view of (A) the exposure distribution in the feed direction formed by one scan line using the aperture plate of FIG. 3, and (B) its concentration distribution;

Figure 7:
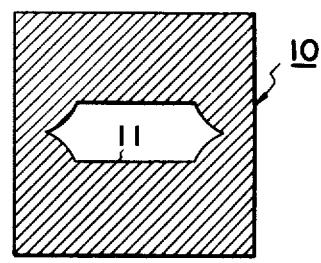
FIG. 7 is an outline of an aperture plate for exposure according to the present invention.

Referring first to FIG. 1 of the drawings, there is shown an optical system of an exposure head of a picture scanning reproducer. An intensity modulated light source 1, a condenser lens 2, an aperture plate 3 having an aperture for exposure, and a focusing lens 4 are arranged coaxially in series. A light beam from the light souce 1 through the aperture is focused into a light dot having a reduced figure similar to the aperture on a sensitive material 6 such as a film attached to the recording cylinder 5.

FIG. 2 shows a conventional aperture plate 3 having a rectangular aperture 7. This kind of aperture plate 3 has a disadvantage. That is, when a picture image is exposed in scanning mode, using the aperture plate 3, and the scanning line is perturbed in the feed direction by vibration of the exposure head caused by the motion of the machine, or by a shock from outside, the overlap of the scan lines doubles the amount of the exposure of the film, resulting in a line of contrasting thick tone.

In order to remove this disadvantage, another conventional aperture plate 8 having a hexagonal aperture 9 as shown in FIG. 3 has been developed. When an image is recorded on a film in scanning mode by light stripes formed by the aperture 9 of the aperture plate 8, the light stripes are made to overlap one another slightly in the feed direction. The amount of exposure of each point in the feed direction can be made uniform by controlling the overlap of the light stripes. Furthermore, if a light stripe forming part of a scan line is temporarily perturbed a little from the regular position in the feed direction, as shown in FIG. 5 (A), the change of the exposure amount of the disturbed part is much less than a factor of two, as shown in FIG. 5(B).

However, this kind of aperture plate 8 has also a defect. That is, when the reproduced image obtained by exposing using the aperture plate 8 with the hexagonal aperture 9 of FIG. 3 is developed, i.e., when the amount of the exposure applied to the sensitive material is converted into the concentration value, the amount of the exposure per one scan line in the feed direction is represented by an isosceles trapezium, as shown in FIG. 6(A), but the concentration function obtained by transforming logarithmically the amount of the exposure has logarithmically increased sides corresponding to the sides of the isosceles trapezium of FIG. 6(A), as shown in FIG. 6(B).

Accordingly, lines of different tone are produced when the scan stripes are overlapped, rather as in the case of use of the aperture of FIG. 2 when vibration occurs.

Referring to FIG. 7, there is shown an aperture plate 10 according to the present invention having an aperture 11 which is similar to that of FIG. 3, except that the sides of the aperture in this plate where they diverge from the point at the end of the aperture are not straight, but are curved so as to diverge outward from one another more and more. In the shown embodiment of the present invention, the lines form symmetrically opposed exponential curves, which is theoretically the optimum configuration.

Figure 8:
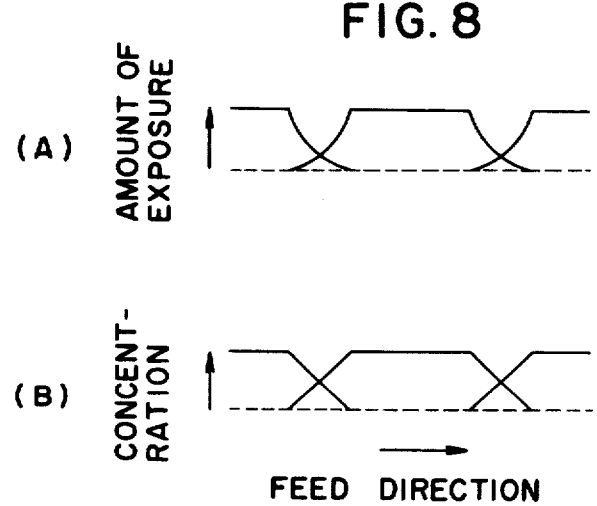
FIG. 8 is a schematic view of (A) the exposure distribution in the feed direction formed by several scan lines, and (B) the corresponding concentration distribution, using the aperture plate of FIG. 7.

The exposure distribution in the feed direction when each scanning line is exposed in order by using the aperture plate 10 having the aperture 11 according to the present invention therefore includes exponentially shaped curves in both its ends corresponding to the exponentially shaped curves of the aperture 11, as shown in FIG. 8(A).

Then the exposure distribution shown in FIG. 8(A) is logarithmically transformed by development into a reproduction image which is recorded by scan lines having the exposure distribution shown in FIG. 8(A), thereby obtaining a concentration value distribution shown in FIG. 8(B), i.e., a uniform concentration value distribution in the feed direction.

Thus the objectionable lines of different tone obtained by using the aperture of FIG. 3 are avoided by using an aperture plate according to the present invention.

Figure 9:
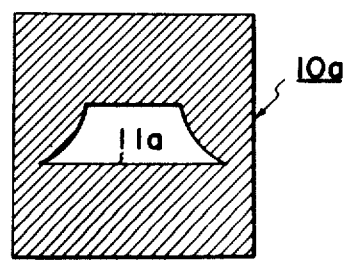
FIG. 9 is an outline of another aperture plate for exposure according to the present invention.

In FIG. 9 there is shown another aperture plate 10(A) having an aperture 11(A) according to the present invention. The aperture 11(A) has the same form as that of the aperture 11 of FIG. 7, except that only one of the two lines which meet at each end is of exponential form, the other being a straight line. It will be apparent to those skilled in the art that the same results as those obtained with the aperture 11 of FIG. 7 will be obtained with this aperture 11(A).

What is claimed is:

1. An exposure head of a picture scanning reproducer which traces scanning lines on a recording medium, comprising, an intensity modulated light source element, a condenser lens element, an aperture plate element having an aperture therethrough, and a focusing lens element, said elements being arranged substantially co-axially in series and adapted to be positioned relative to the recording medium such that a light beam directed from said light source through said aperture is focused upon the recording medium, said aperture having a shape delimited by:

an edge leading with respect to the scanning direction and an edge trailing with respect to the scanning direction which are parallel straight lines in the feed direction perpendicular to the scanning direction; and end edges joining the ends of these leading and trailing edges, said end edges being curves oppositely and symmetrically disposed to one another with respect to the scan direction, and each of said end edges being composed of first and second lines which start from a mutually defined cusp and open up away from one another in the direction away from the cusp so that the angle between the tangents to them increases, the farther away from the cusp whereby the exposure distribution in the feed direction when each scanning line is exposed defines exponentially shaped curves in both of its ends corresponding to the exponentially shaped curves of the aperture to obtain a uniform concentration value distribution in the feed direction due to the overlapping of the exponentially shaped curves on the recording medium.

2. The exposure head 2 as in claim 1, wherein the first and second lines are exponential curves oppositely and symmetrically disposed to one another with respect to the direction perpendicular to the scanning direction.

3. The exposure head 3 as in claim 1, wherein one of the first and second lines is an exponential curve, while the other is a straight line perpendicular to the scanning direction which coincides with the leading or the trailing edge.

* * * * *